US008051459B2

(12) United States Patent
Zhang et al.

(10) Patent No.: US 8,051,459 B2
(45) Date of Patent: Nov. 1, 2011

(54) METHOD AND SYSTEM FOR EXTENDING SELINUX POLICY MODELS AND THEIR ENFORCEMENT

(75) Inventors: Xinwen Zhang, San Jose, CA (US); Jean-Pierre Seifert, San Jose, CA (US); Masoom Alam, Peshawar (PK)

(73) Assignee: Samsung Electronics Co. Ltd., Suwon (KR)

( * ) Notice: Subject to any disclaimer, the term of this patent is extended or adjusted under 35 U.S.C. 154(b) by 990 days.

(21) Appl. No.: 11/957,187

(22) Filed: Dec. 14, 2007

(65) Prior Publication Data
US 2008/0184335 A1 Jul. 31, 2008

Related U.S. Application Data

(60) Provisional application No. 60/897,547, filed on Jan. 26, 2007.

(51) Int. Cl.
*G06F 21/22* (2006.01)
*G06F 9/00* (2006.01)

(52) U.S. Cl. ................................. 726/1; 713/1
(58) Field of Classification Search ........................ None
See application file for complete search history.

(56) References Cited

U.S. PATENT DOCUMENTS

| 7,546,629 | B2* | 6/2009 | Albert et al. ........................ 726/1 |
| 2006/0015723 | A1* | 1/2006 | Lui et al. ........................ 713/167 |
| 2006/0015860 | A1* | 1/2006 | Liu et al. ........................ 717/162 |
| 2007/0198853 | A1* | 8/2007 | Rees ............... 713/189 |
| 2008/0060051 | A1* | 3/2008 | Lim .................... 726/1 |
| 2008/0141335 | A1* | 6/2008 | Thomas ........................ 726/1 |
| 2008/0141338 | A1* | 6/2008 | Kim et al. ........................ 726/1 |
| 2009/0125974 | A1 | 5/2009 | Zhang et al. |
| 2009/0158385 | A1* | 6/2009 | Kim et al. ........................ 726/1 |
| 2009/0271844 | A1* | 10/2009 | Zhang et al. ........................ 726/2 |
| 2010/0162240 | A1* | 6/2010 | Zhang et al. ........................ 718/1 |
| 2010/0287598 | A1* | 11/2010 | Korkishko et al. ................. 726/1 |

OTHER PUBLICATIONS

Horie et al, "Adaptive Access Policy for the Linux Kernel", 2005, Proceedings of the 2005 Symposium on Applications and the Internet (SAINT'05), IEEE Computer Society, p. 1-7.*
Athey et al, "Towards Intuitive Tools for Managing SELinux: Hiding the Details but Retaining the Power", Mar. 12, 2007, Tresys Technology, p. 1-13.*
Teo et al, "Towards the Specification of Access Control Policies on Multiple Operating Systems", Jun. 2004, Proceedings of the 2004 IEEE Workshop on the Information Assurance and Security, p. 210-217.*
Hicks et al, "A Logical Specification and Analysis for SELinux MLS Policy", Jun. 2007, SACMAT '07, p. 91-100.*
Zanin et al, "Towards a Formal Model for Security Policies Specification and Validation in the SELinux System", Jun. 2004, SACMAT '04, p. 136-145.*
Trusted Computing Group timeline, Trusted Computing Group, pp. 1-3, Apr. 2009, US.
SELinux: Information Assurance Through Partnership, National Security Agency, pp. 1-9, Mar. 14, 2007, US.
TPM Main Parts 1-3, Specification Version 1.2, Level 2 Revision 103, Jul. 9, 2007, pp. 1-170 (Part 1), 1-186(Part 2), 1-318 (part 3), US.

* cited by examiner

*Primary Examiner* — Christopher Revak
(74) *Attorney, Agent, or Firm* — Beyer Law Group LLP

(57) ABSTRACT

A Security Enhanced Linux (SELinux) system implementing extended policy models and method for their enforcement, is provided. Extended attributes are defined to specify extended policies. The SELinux policy model is extended to include the extended policies. The extended policies are enforced in addition to SELinux Type Enforcement. In one implementation, defining extended attributes involves defining TC-related attributes to specify TC-related policies. Further, extending the SELinux policy model includes extending the SELinux policy model to include the TC-related policies, in addition to SELinux Type Enforcement. Furthermore, enforcing the extended policies includes enforcing the TC-related policies in addition to SELinux Type Enforcement.

37 Claims, 7 Drawing Sheets

10

20

METHOD AND SYSTEM FOR EXTENDING SELINUX POLICY MODELS AND THEIR ENFORCEMENT

RELATED APPLICATION

This application claims priority from U.S. Provisional Patent Application Ser. No. 60/897,547, filed on Jan. 26, 2007, incorporated herein by reference.

FIELD OF THE INVENTION

The present invention relates in general to Linux operating systems and in particular to Security Enhanced Linux (SELinux).

BACKGROUND OF THE INVENTION

In computer security, Discretionary Access Control (DAC) provides an access control model in which a subject with owner permissions is capable of passing permissions to any other subject. However, the fundamental weakness in the DAC model is that the ability to grant and use access also allows malicious software to obtain control of important system resources.

SELinux is an initiative by the National Security Agency (http://www.nsa.gov/selinux/), which attempts to address such weaknesses. SELinux uses Mandatory Access Control (MAC) mechanisms that provide only those necessary accesses a program needs to perform its task (also known as the principle of least privilege). SELinux is an implementation of MAC using Linux Security Modules (LSM) in the Linux kernel, based on the principle of least privilege. A Linux kernel integrating SELinux enforces MAC policies that confine user programs/processes and system servers to the minimum amount of privilege they require for performing tasks. This is independent of the traditional Linux access control mechanisms.

To implement such confinement, SELinux provides a security context by associating access control attributes of the form user:role:type to all subjects (e.g., a medical application) and objects (e.g., files containing a medical record). Within that security context, the "type" attribute represents the type of the subject or the object (e.g., file, directory). The identification of subjects, objects and their access enforcement by means of types is formally known as Type Enforcement (TE). The "role" attribute within the security context is built upon the type attribute. This means that access control in SELinux is primarily enforced via TE. Instead of directly associating a user (e.g., Mr. XYZ—a doctor) with a type (e.g., medicalApplication_t), currently, SELinux associates a user with a role (e.g., Physician Role) and the role with a set of types. The role merely simplifies the management of users and access control is still enforced by the TE paradigm.

Because SELinux uses a policy model that is based on user (identity), roles and types, a program's permission to perform an action on an object (e.g., to open a file/directory/security key/network connection) is determined by: the user who is running the program, the role of the user, the type of the program and the target object. As such, the current SELinux security context is limited to TE only.

With the proliferation of Linux, SELinux is included in most open source and commercial Linux distributions. Further, Trusted Computing (TC), a technology developed and promoted by the Trusted Computing Group (https://www.trustedcomputinggroup.org/home), is also proliferating. There is, therefore, a need for a SELinux policy model with additional attributes.

BRIEF SUMMARY OF THE INVENTION

The present invention provides a Security Enhanced Linux (SELinux) system implementing extended policy models and method for their enforcement. The SELinux policy model and enforcement are extended to cover other attributes in addition to traditional SELinux Type Enforcement (TE).

Specifically, attributes are defined to specify extended policies, and the SELinux policy model is extended to include these policies, wherein the policies are enforced in addition to SELinux Type Enforcement.

In one implementation, defining extended attributes includes defining TC-related attributes to specify TC-related policies. Further, extending the SELinux policy model includes extending the SELinux policy model to include the TC-related policies, in addition to SELinux Type Enforcement. Furthermore, enforcing the extended policies includes enforcing the TC-related policies in addition to SELinux Type Enforcement.

These and other features, aspects and advantages of the present invention will become understood with reference to the following description, appended claims and accompanying figures.

DETAILED DESCRIPTION OF THE INVENTION

The present invention provides a Security Enhanced Linux (SELinux) system implementing extended policy models and method for their enforcement. This involves defining extended attributes that specify extended policies, extending the SELinux policy model to include the extended policies, and enforcing the extended policies in addition to SELinux Type Enforcement.

In one embodiment, the extended attributes comprise TC-related attributes (e.g., TC attributes), and the extended policies comprise TC-related policies (e.g., TC policies). The TC policies include high-level TC policies in SELinux applications such as operating systems. The identity-role-type (user:role:type) policy model of traditional SELinux is extended by including general and dynamic subject and object attributes to specify TC-related policies (e.g., user:profile:role:type: system profile). Thus, access control decisions are checked based on not only traditional SELinux policies, but also other runtime properties of programs such as TC-related integrity values and configurations.

SELinux

In an operating system, the kernel manages system resources (e.g., CPU cycles, storage, programs, communication channels) and controls access to, and usage of, system resources by programs. Traditional SELinux only enforces policies based on identities, roles and domains/types, which are static and pre-defined by a system administrator. However, TC policies require access control decisions based on platform configurations and runtime properties of subjects and objects, which are typically dynamic. For example, in TC a program can only access a file or open a connection or revoke a service when the program is running in a good state and its runtime integrity is preserved during the access. For these TC requirements, the traditional SELinux static/pre-defined roles and types cannot securely confine the activities of programs and processes.

For security purposes, the traditional Linux operating system kernel includes a DAC module to determine if a program can have permission to access a resource. Referring to the architecture 10 in FIG. 1, a set of rules 11 specify the circumstances under which an accessing program (subject) 12 can access a resource or another program (object) 13. Based on the rules, a DAC module 14 in the Linux kernel decides if the access request is permitted or denied.

Figure 1:
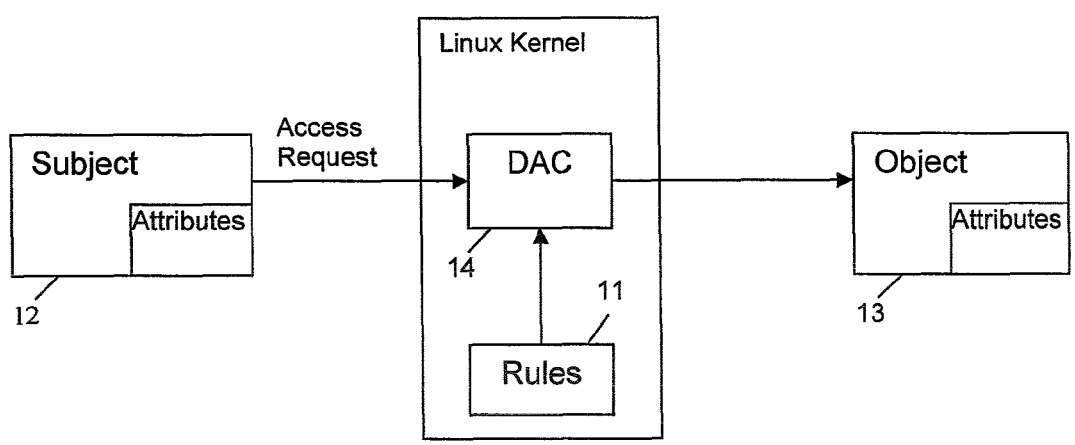
FIG. 1 shows an access control architecture.
Figure 2:
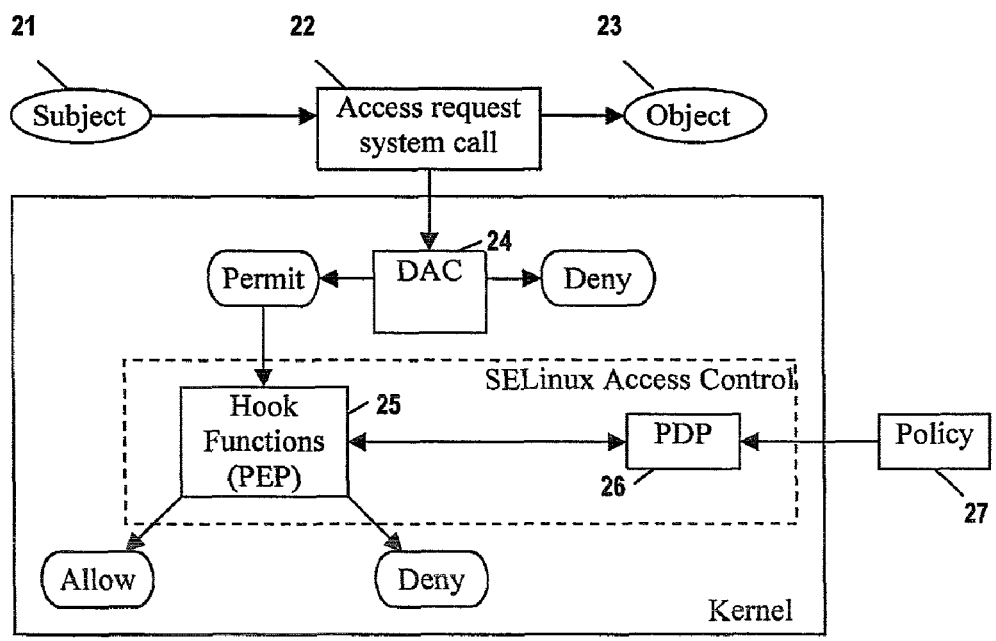
FIG. 2 shows an access control architecture for SELinux.

Referring to the architecture 20 in FIG. 2, according to SELinux when a subject 21 makes an access request system call 22 for access to an object 23, a DAC module 24 in the Linux kernel performs initial DAC checking, as described in relation to FIG. 1. If the DAC module 24 tentatively permits access, then hook functions 25 receive the access request and forward it to a policy decision point (PDP) 26 for further checking before access is allowed. The PDP is a loadable kernel module (LKM), wherein policies 27 are pre-defined and inserted into the PDP. Based on the policies, the PDP 26 makes the final decision as to whether the access request is allowed or denied. The hook functions 25 enforce the decisions (e.g., allow or deny access) from the PDP 26. Conceptually, these hook functions can be called policy enforcement point (PEP) functions.

Extending SELinux

Figure 3:
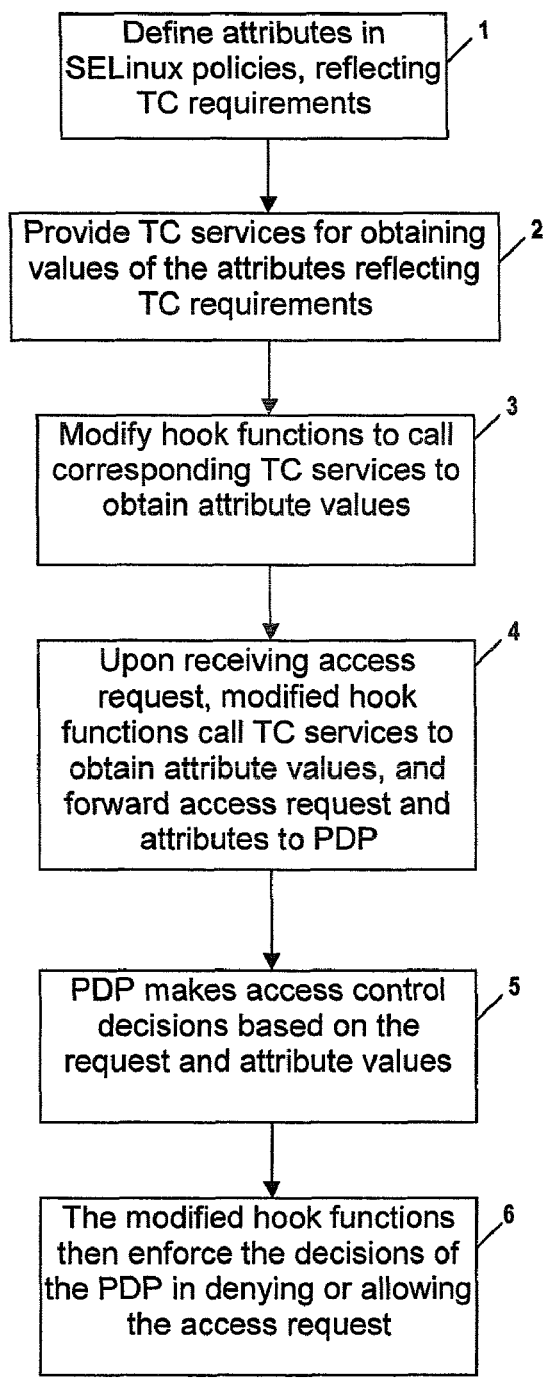
FIG. 3 shows a process for extending the SELinux policy model and enforcement for trusted computing paradigms, according to an embodiment of the present invention.

In one embodiment, the present invention extends the policy model of SELinux to general attribute-based access control policies, and extends the policy enforcement architecture in SELinux with TC-supporting functions at the operating system level. This allows enforcement of TC policies including high-level TC policies in SELinux applications. Referring to FIG. 3, an example process 30 for providing support for TC-policies in a SELinux operating system (OS), according to the present invention, involves the following steps:

1. A set of attributes are defined in SELinux policies. These attributes reflect TC requirements including high-level TC requirements such as platform states and integrity measurements. Policy modeling tools are used to precisely and formally define policies according to high-level and informal requirements.
2. A set of TC services are provided at the OS level, wherein the TC services provide primitive functions to obtain the current status/values of said attributes defined in policies, and to provide interfaces for retrieving attribute values. By leveraging underlying trusted hardware, the authenticity and integrity of attribute values can be preserved and verified. An example is an integrity measurement service which measures booting and runtime integrity values for a process. The implementation of TC services are outside the scope of the present invention.
3. To enforce extended (augmented) policies in SELinux, the original PEP (hook functions) defined in the Linux kernel are modified to call corresponding TC services and retrieve current values for the TC requirement attributes defined in policies.
4. Upon receipt of an access request, the modified PEP first calls the TC services to obtain the attribute values for the TC requirements, and then forwards the access request to the PDP along with parameters including subject/object identities, roles, types and the obtained TC-related attribute values.
5. The PDP makes access control decisions based on the forwarded request and parameters, including the TC-related attribute values defined in the policies, and returns its decisions (allow/deny results) to the modified PEP
6. The modified PEP enforces the decisions of the PDP by either enabling the requested access operation by the requesting program (process) upon receiving an "allow" decision from the PDP, or returning an exception to the requesting program upon receiving a "deny" decision from the PDP.

The security context in traditional SELinux is user:role:type, and the security mechanism in SELinux is Type Enforcement (roles are used for grouping users only). According to the present invention, the traditional SELinux policy model is extended to include a general set of TC-related attributes in addition to Type Enforcement. The SELinux policy model is extended for secure information sharing or usage control in TC. The security context of SELinux is extended to: user:profile:role:type:system. Each role can be categorized as a set of general and customizable attributes.

Figure 4:
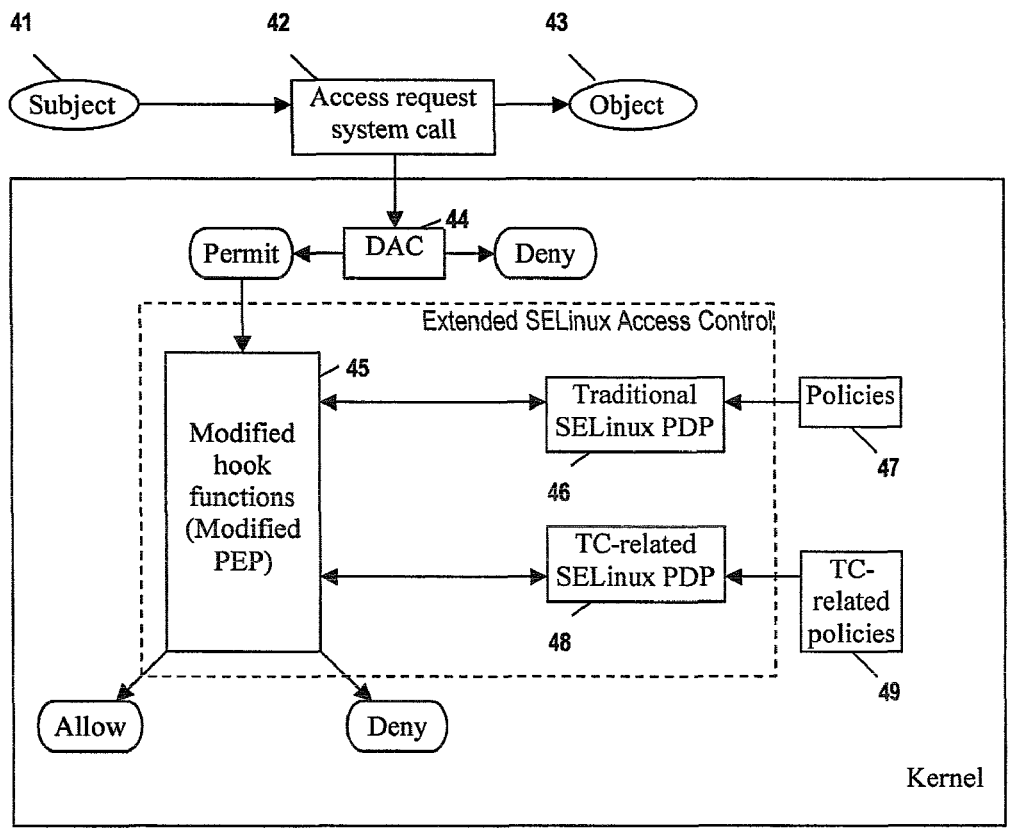
FIG. 4 shows an example architecture for extending the SELinux policy model and enforcement for trusted computing paradigms, according to the present invention.

FIG. 4 shows an example architecture 40 for extended SELinux according to the steps in FIG. 3. When a subject 41 makes an access request system call 42 for access to an object 43, a DAC module 44 in the Linux kernel performs initial DAC checking, as described in relation to FIG. 1. If the DAC module 44 tentatively permits access, then the modified hook functions 45 receive the access request and forward it to: (1) a traditional PDP 46 and (2) a TC-related PDP 48 according to the present invention, for further checking before access is allowed. The TC-related PDP 48 is a loadable kernel module wherein the TC-related policies 49 are pre-defined and inserted into the TC-related PDP 48. Based on the traditional policies 47 and the TC-related policies 49, the traditional PDP 46 and the TC-related PDP 48 makes the final decision as to whether the access request is allowed or denied.

Specifically, when the TC-related PDP 48 receives an access request from the modified hook functions 45, the TC-related PDP 48 queries the loaded TC-related policies 49, wherein a policy defines that a subject (process) with a user:profile:role:type:system can access an object (e.g., a file) with another user:profile:role:type:system. The modified hook functions 45 enforce the decisions (e.g., allow or deny access) from the PDP 46 and the TC-related PDP 48.

Figure 5:
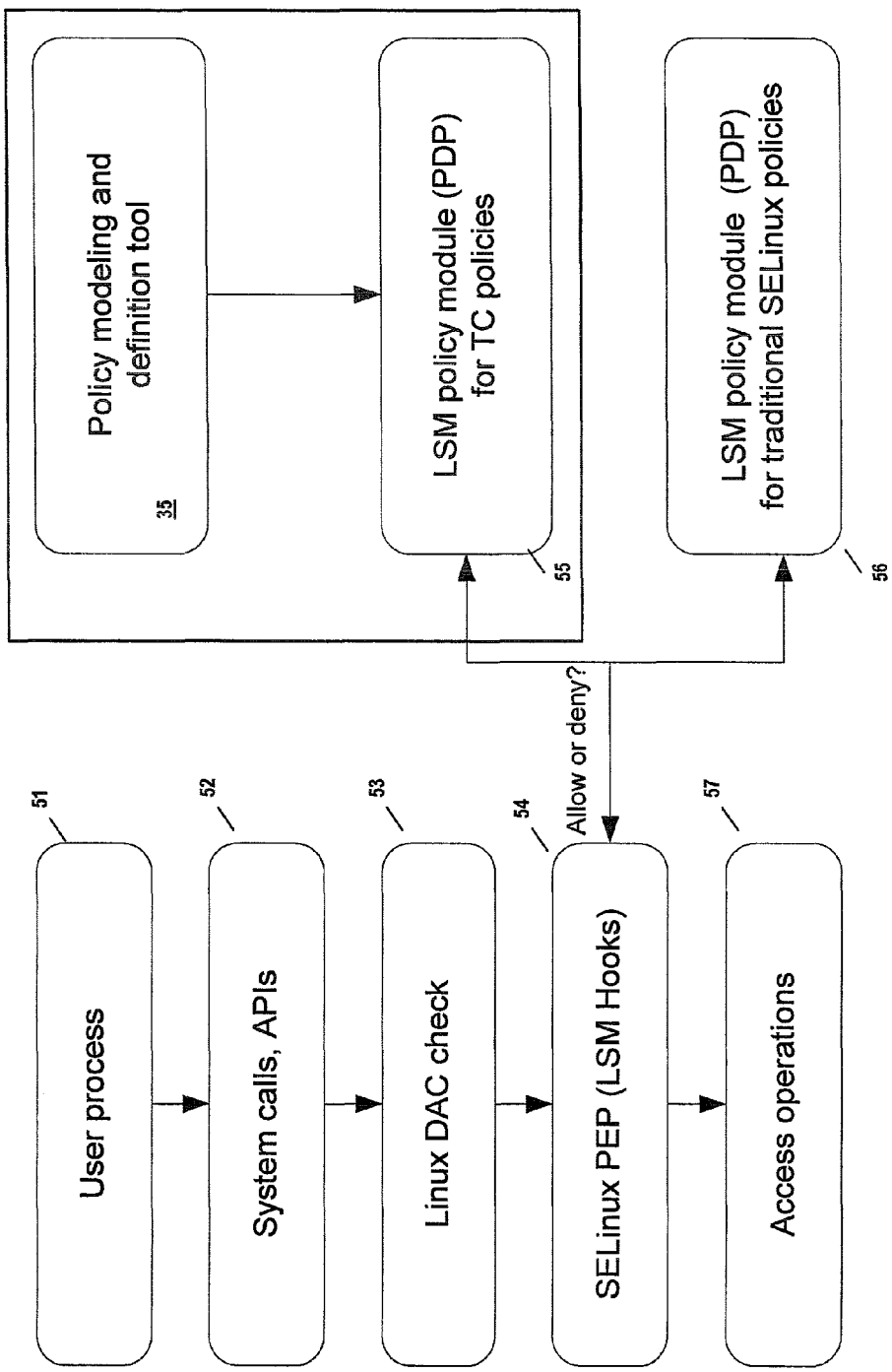
FIG. 5 shows an example enforcement workflow for an extended SELinux operating system including support for TC policies, according to the present invention.

FIG. 5 shows an example enforcement workflow 50 for an extended SELinux operating system including support for TC-policies, according to the present invention. In step 51, a user process initiates an access request by making a system call. In step 52, a system call is received by the kernel, wherein step 53 the DAC module checks to determine if access is permitted. If access is permitted, in step 54 the SELinux hook functions call the traditional PDP and the TC-related PDP for TC policies. In steps 55 and 56, based on the traditional policies and the TC-related policies, the traditional PDP 46 (FIG. 4) and the TC-related PDP 48 (FIG. 4), respectively, make the final decision as to whether the access request is allowed or denied. In this example, only when both the PDP 48 and TC-related PDP 48 decide that the request is allowed, will the modified PEP 45 allow the requested access in step 57 (FIG. 5). FIG. 5 further shows policy modeling and a definition tool 35 which provides TC-related policies as discussed above.

An example scenario according to the work flow in FIG. 5 is now described. A health-care application process (subject) issues an access request (or command) to write to a medical record file (object). This will trigger a system call. The Linux DAC performs normal security checks employed by the Linux/Unix systems (Discretionary Access Control). Then, the modified PEP (modified LSM hooks) in the extended SELinux according to the present invention, extend the normal DAC security check by forwarding the request to the TC-related PDP, as well as the traditional PDP. The TC-related PDP interprets SELinux policies extended to include TC-related policies and makes an access decision. A TC-related policy according to the present invention defines that a subject with a user:profile:role:type:system can access an object with another user:profile:role:type:system.

Figure 6:
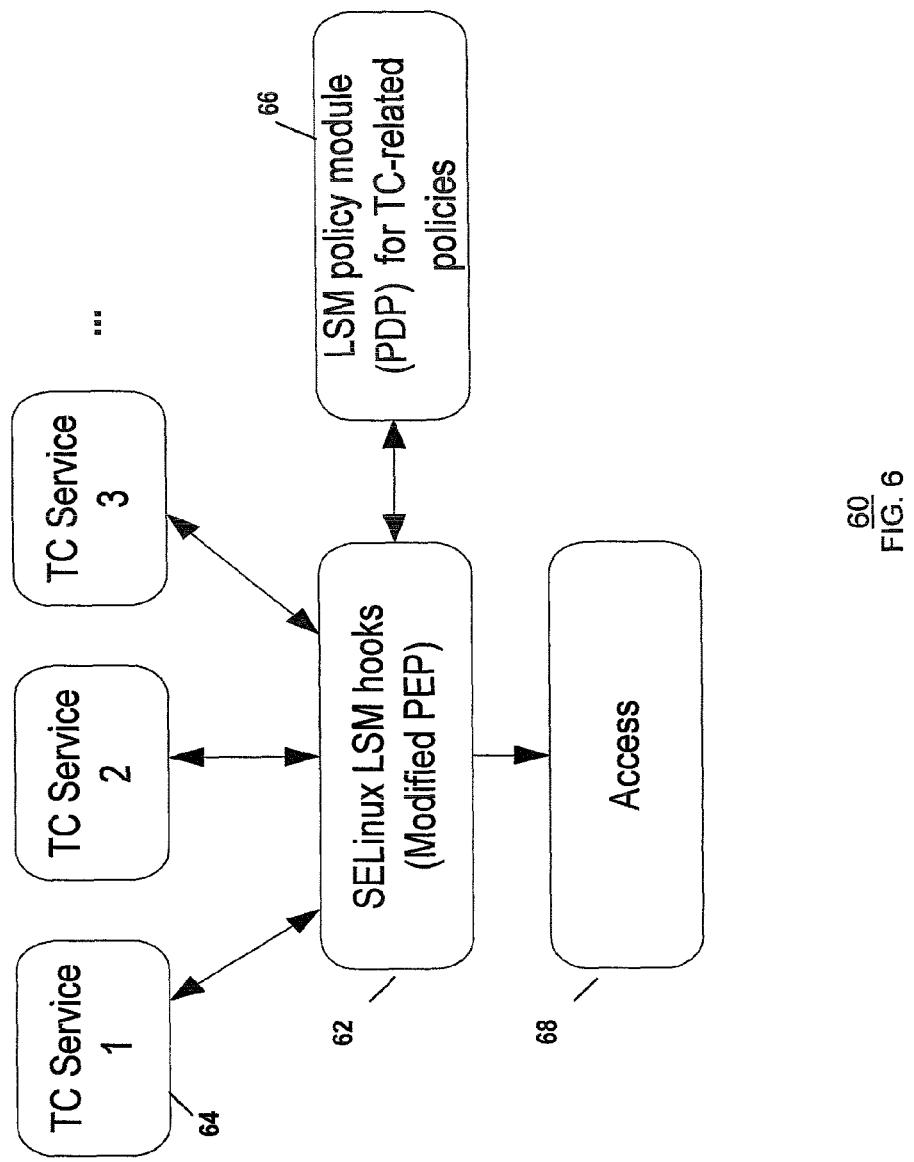
FIG. 6 shows an example implementation for enforcing extended SELinux policies including TC-related policies, according to the present invention.

FIG. 6 shows an example implementation of steps 3-6 in FIG. 3, wherein for an access request, a modified PEP 62 uses one or more TC services 64 to obtain profile and attributes values for the TC-related policies (i.e., user:profile:role:type: system profile and system attribute information). The TC services were discussed above. The user:profile:role:type: system profile and system attribute information are sent to a TC-related PDP 66 by the modified PEP 62 as access request parameters. The TC-related PDP 66 makes access decisions based on extended SELinux policies including TC-related policies and the modified PEP 62 enforces those decisions, and allows access operations 68 when allowed by the TC-related PDP 66. Specifically, after obtaining the attributes, the TC-related PDP 66 makes decisions based on policies. If a TC-related policy based on the obtained attributes enables the requested access, then the TC-related PDP 66 returns an "allowed" decision to the modified PEP 62; otherwise, if the TC-related policy denies the access request, the TC-related PDP 66 returns a "denied" decision to the modified PEP 62. The traditional PDP 56 (FIG. 5) also makes an access decision based on the traditional SELinux policies. If both access decisions allow access, then the health-care application process can access the medical record file to perform a write operation.

In another implementation according to the present invention, according to steps alternate to step 3-6 in FIG. 3, the hook functions in the SELinux kernel are not modified. Upon an access request, the TC-related PDP calls the TC services to obtain subject and object attribute values, then evaluates corresponding policies and sends decisions back to the PEP. This approach eliminates the modification of hook functions but may introduce performance overhead for the PDP, especially for frequent access requests. This alternative is shown in the example architecture 70 in FIG. 7, wherein the aforementioned profile and system attributes for TC-related policies (i.e., user:profile:role:type:system profile and system attribute information) are acquired by a TC-related PDP 76 directly via calls to the TC services 74 (the TC services 74 are similar to the TC services 64 in FIG. 6). The PEP 72 only forwards user:role:type to the TC-related PDP 76, as usual.

The TC-related PDP 76 makes access decisions based on extended-SELinux policies including TC-related policies and the PEP 72 enforces those decisions, and allows access operations 78 when allowed by the TC-related PDP. Specifically, after obtaining the attributes from the TC-services 74, the TC-related PDP 76 makes decisions based on the policies. If a TC-related policy based on the obtained attributes enables the requested access, then the TC-related PDP returns an "allowed" decision to the PEP 72; otherwise, if the TC-related policy denies the access request, the TC-related PDP 76 returns a "denied" decision to the PEP 72. The traditional PDP 56 (FIG. 5) also makes an access decision based on the traditional SELinux policies. If both access decisions allow access, then the health-care application process can access the medical record file to perform a write operation.

TC-related attributes are system related (e.g., integrity), while profiles (e.g., location) are used for information sharing or usage control related attributes. In addition to the TC-related attributes, the present invention is useful with profiles with similar mechanisms, i.e., by leveraging usage control related services on the operating system platform.

Figure 7:
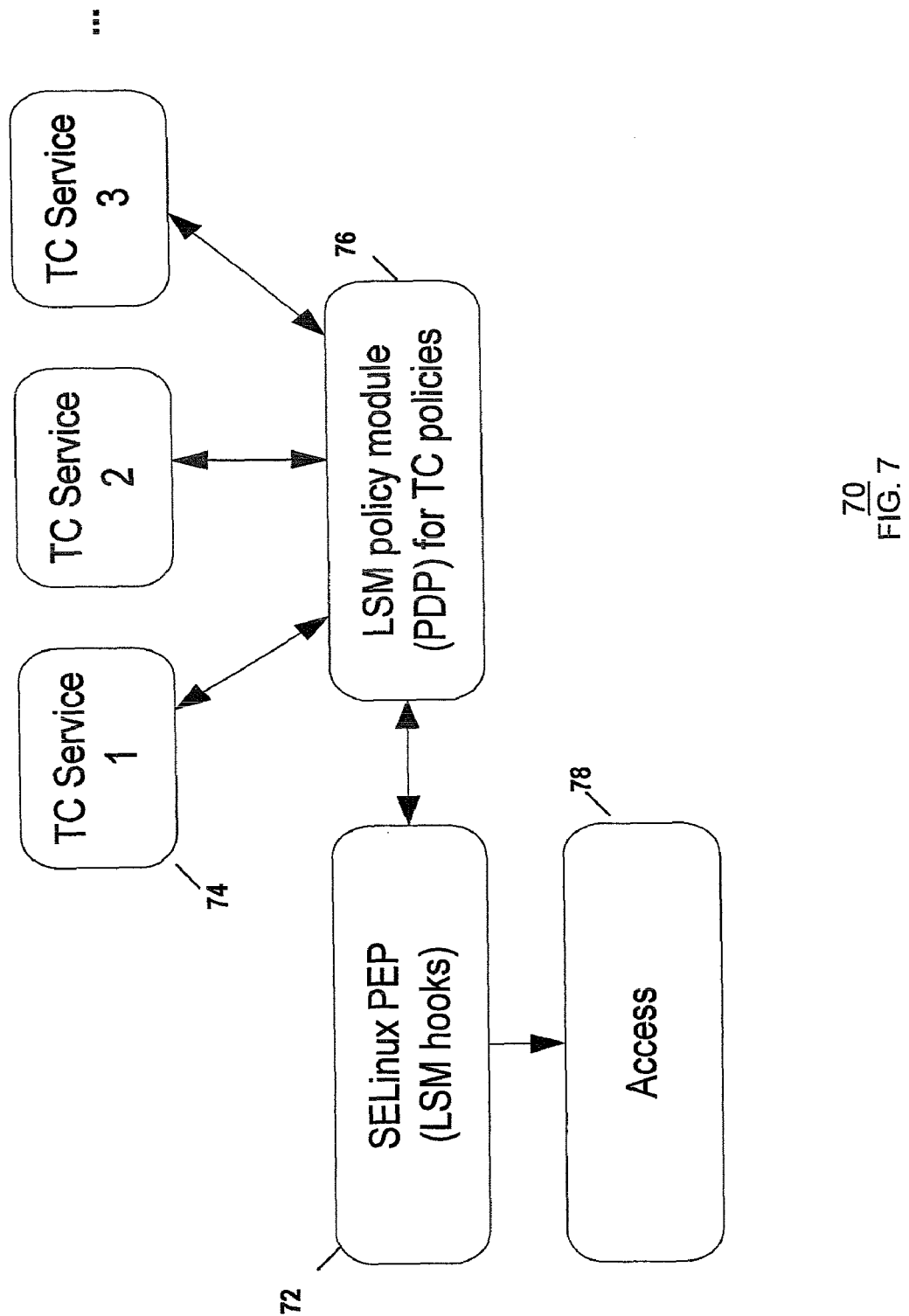
FIG. 7 shows another example implementation for enforcing extended SELinux, according to the present invention.

In FIGS. 6 and 7, the TC Service 1,2,3 are installed on a specific machine (e.g., on a health professional's machine), and communicate to the Trusted Platform Module (TPM) for integrity measurement and verification of the medical software on that machine making the access request, for example. TC services obtain attributes for: (1) a subject such as integrity values of a program file, configuration files, etc., (2) a protected object (e.g., the medical record of a patient), (3) the platform, (e.g., the integrity values of the booting components such as boot loader, BIOS, kernel image), and (4) other security-related attributes such as location (for mobile devices), the trusted time, etc. For example, in integrity measurement, a report TC service stores integrity values in a TPM for use by the SELinux PDP.

TC services are agents or software components which communicate with a Trusted Platform Module (TPM) located in a TC-enabled device. In Trusted Computing, devices are equipped with the TPM which is a hardware chip that uses cryptographic mechanisms to certify the integrity of the (application/system) software running on the device, and to protect I/O and storage of data inside the device. This practice is designed to effectively fight against malicious code, viruses and invasion of privacy. This is because prior practices for protecting against malicious code and other threats purely at the software level have been lacking. It has been learned that a trusted and tamper-proof security basis cannot be achieved using software based solutions alone. As such, the Trusted Computing Platform Alliance specifies Trusted devices such as PCs, PDAs, mobile phones, which include the TPM, in order to make electronic applications (e.g., e-commerce, e-health and e-government) more trustworthy.

The TPM is a microcontroller that stores keys, passwords and digital certificates. It can be included to any computing/electronic device (platform). The TPM ensures that the information stored in the device is made more secure from external software attack and physical theft. Security processes, such as digital signature and key exchange are protected. Access to data and confidential information in a platform can be denied if the boot sequence is not as expected. Critical applications and capabilities such as secure e-mail, secure web access and local protection of data are thereby made much more secure. TPM capabilities also can be integrated into other components in a system. According to the TC specification a remote system will be trusted if all of its hardware/software components can remotely certify their trustworthiness by means of the TPM. Further, the user has the ability to disable TC services, making the system distrusted and thereby, ineligible for TC-enabled services applications.

Further, according to the specifications for TC-enabled systems, TC-enabled systems (platforms) implement the following technical functionalities:

Integrity measurement, storage and reporting: Measure the integrity of important components during boot time and runtime, and store integrity values in the TPM, and report to other entities.

Protected I/O: All information sent via I/O devices such as monitors, sound cards, etc., should be encrypted in a way that only intended applications can capture the information.

Curtaining Memory: Data stored in memory should be strictly isolated from other applications by means of encryption.

Sealed Storage: Permanent storage devices such as harddrives should be in a sealed (encrypted) form so that only the originating application or device can read them. The objective is that if the data is moved from the sealed storage maliciously to another device, that data becomes readable.

Remote Attestation: Remotely certify to third parties in enciphered form, which software is running, whether malicious code has modified the corresponding software, the status of the hardware components, etc. This enables service providers to deploy their services across geographical boundaries.

The functions of TC services leverage the underlying TC hardware (i.e., TPM). For example, platform and application integrity measurement is a TC service that measures key components of the systems (e.g., kernel images, configuration files, program images) and stores measured values in the TPM. When called by SELinux, this service reads these integrity values to send to the SELinux PEP or PDP functions for verification. The TPM provides secure storage and key generation capabilities, similar to other hardware authentication devices, so that it can be used to create and/or store both user and platform identity credentials for use in authentication. The TPM can also protect and authenticate user passwords, thereby providing an effective solution for integrating strong, multifactor authentication directly into the computing platform. With the addition of complementary technologies such as smart cards, tokens and biometrics, the TPM enables true machine and user authentication.

Examples of Extending SELinux

As discussed, the identity-role-type policy model of SELinux is extended according to the present invention by including general and dynamic subject and object attributes to specify TC-related policies (e.g., user:profile:role:type: system profile). Examples of extending SELinux according to the present invention are provided in Tables 1 and 2 below. Other extensions are also possible and contemplated by the present invention.

TABLE 1

Examples of extending usage control

Medical_r Role is assigned to medicalApplication_t type and its profile contains the following attributes:
    maximumNoOfDaysAllowed
    deleteStatus
    cannotFurtherDissiminate
    latestAntiSpyWareName
    latestAntiSpyWareVersion
    accessLocation
    numberOfTimes
Traditional SELinux provides operands in the constrain expression:
    u1/u2/u3, r1/r2/43, t1/t2/t3

TABLE 1-continued

Examples of extending usage control

The constrain expression is extended with a new operand type called 'p':
    p1/p2/p3 (extension)
Attributes are then checked against specified values in the constrain expression:
    constrain file (
        t2 = medicalObject and
        p2.maximumNoOfDays = 30 and
        p2.cannotFurtherDissiminate = TRUE and
        p2.location = "Office" and
        p2.numberOfTimes = 10
    )

TABLE 2

Examples of extension for TC attributes medical_r Role is assigned to medicalApplication_t type and its system contains the following attributes:
    memoryStatus
    platformIntegrity
    systemTime
    sealedStorage
Traditional SELinux provides operands in the constrain expression:
    u1/u2/u3, r1/r2/43, t1/t2/t3
The constrain expression is extended with a new operand type called 's':
    s1/s2/s3
Attributes are then checked against specified values in the constrain expression:
    constrain file (
        t2 = medicalObject and
        s1.memoryStatus = KNOWN_GOOD_STATE and
        s.platformIntegrity = KNOWN_GOOD_STATE and
        s.SystemTime= TRUSTED
    )

Policy Modeling Tools

As noted, policy modeling tools are used to define high-level TC security requirements. For example, policy modeling tools are used to abstract the complexity of the traditional/original SELinux policies. Any modeling language such as Unified Modeling Language, used in modeling a software, can be used to model a SELinux policy. The policy modeling tool transforms the high-level TC policies to low-level SELinux policies.

The policies are defined according to the high-level and informal requirements. One example is: A nurse can read the medical records of every patient for her specialization when her platform is in a known good state. But the nurse shall not be permitted to read the medical records of the patient if the patient's disease is marked confidential. Another example is: A physician as a service requester can modify any medical record for which the physician is the designated primary care physician for treatment purposes only. But the service requestor is not to disclose it to any third party. Moreover, the medical records are accessible from a registered computer at a medical office, and a mechanism is used to prevent a possible information leak.

Given a service requester (subject) that is attempting to access an on-line patient record (object), the following steps are performed during authentication and authorization:

1. The service requester authenticates itself (e.g., provides a username/password or shows biometric credentials, etc.) to a hospital site and is assigned a role (e.g., surgeon, nurse, general practitioner).

2. After authentication, a security gateway evaluates the service requestor's eligibility for the requested resource according to his role, as well as static and dynamic constraints (e.g., access on working days only).

3. If access is granted, the security gateway attaches a target specific policy for SELinux to the object/information released.

4. The SELinux policy is shipped with the released object/information. Using TC key-concepts, the SELinux policy enforces constraints on the future usage of the object/information on the service requestor's platform. The correct enforcement of the SELinux policies is verified through the TC-function called Remote Attestation.

By implementing TC-related SELinux policy enforcement, the present invention seamlessly integrates with existing TC technologies such as integrity measurements, execution environment protection and platform state monitoring and reporting. Example implementations can be in platforms equipped with hardware-based roots of trust, such as Trusted Platform Module or Mobile Trusted Module (MTM), which are under a standardization process in the Trusted Computing Group.

As is known to those skilled in the art, the aforementioned example architectures described above, according to the present invention, can be implemented in many ways, such as program instructions for execution by a processor, as computer program product on computer readable media, as logic circuits, as an application specific integrated circuit, as firmware, etc. Though the present invention has been described with reference to certain versions thereof; however, other versions are possible. Therefore, the spirit and scope of the appended claims should not be limited to the description of the preferred versions contained herein.

What is claimed is:

1. A method for enforcing Security Enhanced Linux (SELinux) policy models, including the steps of:
defining extended trusted computing (TC) attributes to specify extended trusted computing policies;
extending the SELinux policy model to include the extended trusted computing policies, in addition to SELinux Type Enforcement; and
enforcing, on a computing platform having a processor and trusted computing hardware, the extended trusted computing policies in addition to SELinux Type Enforcement.

2. The method of claim 1 wherein defining TC-related policies further includes defining general and dynamic subject and object attributes to specify TC-related policies.

3. The method of claim 2 wherein extending the SELinux policy model further includes extending the identity-role-type policy model (user:role:type) of SELinux to include user:profile:role:type:system profile reflecting TC requirements.

4. The method of claim 1 wherein the step of enforcing further includes making access control decisions based on TC-related policies in addition to SELinux Type Enforcement.

5. The method of claim 4 wherein extending the SELinux policy model further includes providing TC services for obtaining values of the TC-related attributes.

6. The method of claim 5 wherein making access control decisions further includes:
upon receiving a request from a subject for access to an object, utilizing the TC services to obtain values for the TC-related attributes; and
making access control decisions by denying or allowing access based on the obtained values for the TC-related attributes.

7. The method of claim 6 wherein the values for the TC-related attributes includes values for subject, object and user: profile:role:type:system.

8. The method of claim 6 further including the steps of:
providing a TC-related policy decision point (PDP) function configured for denying or allowing access based on the obtained values for the TC-related attributes; and
upon receiving an access request, invoking the TC-related PDP function and providing the obtained TC-related attributes to the TC-related PDP function for making access control decisions.

9. The method of claim 8 further including the step of modifying a SELinux hook function such that upon receiving an access request, the modified SELinux hook function invokes the TC services for obtaining values of the TC-related attributes, and invokes the TC-related PDP function with the obtained TC-related attributes for making access control decisions.

10. The method of claim 6 further including the steps of:
providing a TC-related PDP function configured for denying or allowing access based on values for TC-related attributes; and
upon receiving an access request, invoking the TC-related PDP function, wherein the PDP function is further configured for invoking the TC services to obtain values of the TC-related attributes for making access control decisions.

11. A computer-implemented method for enforcing Security Enhanced Linux (SELinux) policy models, comprising:
maintaining extended trusted computing attributes that specify extended trusted computing policies in a SELinux operating systems;
generating an extended SELinux policy model that includes the extended policies; and
enforcing, on a computing platform having a processor and trusted computing hardware, the extended policies for program access requests based on the extended SELinux policy model, in addition to SELinux Type Enforcement.

12. The computer-implemented method of claim 11 wherein the TC-related policies include general and dynamic subject and object attributes that specify TC-related policies.

13. The computer-implemented method of claim 12 wherein generating an extended SELinux policy model further comprises generating an extended SELinux policy model that includes user:profile:role:type:system profile reflecting TC requirements.

14. The computer-implemented method of claim 11 wherein enforcing the TC-related policies further includes making access control decisions based on TC-related policies in addition to SELinux Type Enforcement.

15. A computer-implemented method for enforcement of extended policies in a SELinux operating system, comprising:
upon receiving a request from a subject process for access to an object, obtaining values for extended trusted computing (TC) attributes that specify extended trusted computing policies, wherein the extended policies are maintained in an extended SELinux policy model; and
enforcing, on a computing platform having a processor and trusted computing hardware, the extended policies by making access control decisions based on the obtained values for the extended attributes.

16. The computer-implemented method of claim 15 wherein obtaining values for the TC-related attributes further includes utilizing TC service functions to obtain values for the TC-related attributes.

17. The computer-implemented method of claim 15 wherein enforcing the TC-related policies further includes making access control decisions based on the obtained values for
the TC-related attributes in addition to SELinux Type Enforcement.

18. The computer-implemented method of claim 16 wherein making access control decisions further includes:
after receiving a request from a subject process for access to an object, invoking the TC service functions to obtain values for the TC-related attributes; and
making access control decisions by denying or allowing access based on the obtained values for the TC-related attributes.

19. The computer-implemented method of claim 15 wherein the values for the TC-related attributes includes values for user:profile:role:type:system attributes.

20. A system for enforcing extended requirements in a Security Enhanced Linux (SELinux) application, comprising:
an extended SELinux policy module including extended trusted computing (TC) policies defined based on extended trusted computing attributes; and
an enforcement module in communication with trusted computing hardware configured for enforcing the extended policies in addition to SELinux Type Enforcement;
the system including a computer platform having a processor, a memory, and computer hardware to implement the extended SELinux policy module and the enforcement module.

21. The system of claim 20 wherein the TC-related attributes include a user:profile:role:type:system profile reflecting TC requirements.

22. The system of claim 21 wherein the extended SELinux policy module further includes user:role:type attributes for SELinux.

23. The system of claim 20 wherein the enforcement module includes a decision module configured for making access control decisions based on TC-related policies in addition to SELinux Type Enforcement.

24. The system of claim 23 further comprising TC service functions configured for obtaining values of the TC-related attributes.

25. The system of claim 24 further comprising hook functions configured for utilizing the TC services to obtain values for the TC-related attributes upon receiving a request from a subject for access to an object, and the decision module is further configured for making access control decisions by denying or allowing access based on the obtained values for the TC-related attributes.

26. The system of claim 25 wherein the values for the TC-related attributes include values for subject, object and user:profile:role:type:system.

27. The system of claim 25 wherein the decision module is configured such that upon receiving an access request, the decision module invokes the TC services to obtain values of the TC-related attributes for making access control decisions.

28. A program product stored on a non-transitory computer useable medium for enforcing Security Enhanced Linux (SELinux) policy models, the program product comprising program code for causing a computer system to perform the following steps:
maintaining extended trusted computing attributes that specify extended trusted computing (TC) policies in a SELinux operating system;
generating an extended SELinux policy model that includes the extended policies; and
enforcing the extended policies for program access requests based on the extended SELinux policy model, in addition to SELinux Type Enforcement.

29. The program product of claim 28 wherein the TC-related policies include general and dynamic subject and object attributes that specify TC-related policies, including user:profile:role:type: system profile.

30. The program product of claim 29 further including program code for generating an extended SELinux policy model that includes user:profile:role:type:system profile reflecting TC requirements.

31. The program product of claim 28 further including program code for making access control decisions based on TC-related policies in addition to SELinux Type Enforcement.

32. A program product stored on a non-transitory computer useable medium for enforcement of Trusted Computing (TC) in a Security Enhanced Linux (SELinux) operating system, the program product comprising program code for causing a computer system to perform the following steps:
upon receiving a request from a subject process for access to an object, obtaining values for TC-related attributes that specify TC-related policies, wherein the TC-related policies are maintained in an extended SELinux policy model; and
enforcing the TC-related policies by making access control decisions based on the obtained values for the TC-related attributes.

33. The program product of claim 32 further including program code for maintaining said extended SELinux policy model.

34. The program product of claim 32 further including program code for utilizing TC service functions to obtain values for the TC-related attributes.

35. The program product of claim 32 further including program code for making access control decisions based on the obtained values for the TC-related attributes in addition to SELinux Type Enforcement.

36. The program product of claim 34 further including program code for:
receiving a request from a subject process for access to an object, and invoking the TC service functions to obtain values for the TC-related attributes; and
making access control decisions by denying or allowing access based on the obtained values for the TC-related attributes.

37. The program product of claim 32 wherein the values for the TC-related attributes include values for user:profile:role:type:system attributes.

* * * * *